Patented Feb. 24, 1953

2,629,717

UNITED STATES PATENT OFFICE 2,629,717

PREPARATION OF AMINOPHYLLINE

Axel T. Nielsen, Old Mystic, Conn., and Aniello A. Romano, Maywood, N. J., assignors to Chas. Pfizer & Co., Inc., Brooklyn, N. Y., a corporation of Delaware No Drawing. Application December 22, 1951, Serial No. 263,004

5 Claims. (Cl. 260—253)

This invention relates to the preparation of a valuable pharmaceutical, aminophylline. More particularly it concerns novel methods for effectuating the reaction of theophylline with ethylenediamine to produce this drug.

The manufacture of aminophylline of high quality has hitherto presented certain major difficulties. The compound is generally prepared by gradual addition of a strong aqueous solution of ethylenediamine to solid theophylline agitated in a suitable vessel, two moles of the theophylline reacting with one of the ethylenediamine. However, this method is commercially unsatisfactory. There is a tendency to form large and hard aggregations or lumps of product, which must be subjected to grinding or milling in order to obtain an acceptable material. Considerable heat is evolved during the reaction, and the presence of such large aggregations of partially or completely reacted aminophylline makes troublesome the maintenance of a controlled temperature and the prevention of decomposition and discoloration. Furthermore, it is often difficult to complete the reaction when these lumps form, since they may contain material which is unreacted or only partially reacted. Because ethylenediamine combines quite readily with carbon dioxide, it is also advisable that air be excluded from the reaction mixture by some device such as a blanket of inert gas. If this is not done, the product contains material which has poor solubility in water and, in general, is of lower quality. Too, when an aqueous solution of ethylenediamine is employed for the reaction, it may be necessary to dry the product to obtain the usually desired and most common form of aminophylline, the hydrate. Another method for preparing the drug involves the reaction of ethylenediamine and theophylline in an organic solvent like alcohol. In this case, while the problems inherent in the use of an aqueous system are obviated, there are the added difficulties encountered in working with inflammable solvents and in later removing such solvents by distillation. This method, therefore, requires more complex apparatus and additional operational steps.

It has now been found that solid theophylline, either anhydrous or hydrated and preferably in finely divided, crystalline form, may be contacted with ethylenediamine vapor to effect rapid reaction and formation of aminophylline of excellent quality. The advantages of this new method are numerous. The most outstanding one is that, when finely divided theophylline is used, there is substantially no aggregation and formation of lumps during the reaction. A soft powder is produced which readily dissolves in water to yield a clear, colorless solution. During the preparation of the aminophylline, the particle size of the theophylline reactant remains practically unchanged and, indeed, there may be some reduction in the average size. There is no necessity to mill or grind the product, and there is no inflammable or contaminating solvent to be removed, thus saving equipment and time. The absence of large aggregates in the reaction mixture serves to reduce to a minimum decomposition and discoloration due to localized overheating. The heat of reaction is readily dispersed from the finely divided powder which prevails throughout the reaction. The product is true aminophylline, containing two molecules of theophylline and one of ethylenediamine, highly desirable for pharmaceutical uses.

According to a preferred embodiment of this invention, the solid theophylline is contacted with ethylenediamine vapor and water vapor simultaneously, and the commercially more valuable aminophylline hydrate is directly produced. This product is composed of two molecules of theophylline and one molecule each of ethylenediamine and water. The reaction may be affected at room temperature. Heating to at least as high as 80° C. does not appreciably affect the stability of the reactants or product and hastens the synthesis, although in most operations it is best to use a temperature of between room conditions and about 60° C. Stoichiometric proportions of the reactants are naturally adequate. However, some excess of ethylenediamine generally facilitates completion of the reaction, while excess water does no harm and may also assist. The aminophylline product may be heated slightly to remove unreacted volatile material, temperatures of substantially between 50° and 80° C. being normally sufficient for such purification.

The new process may be carried out with various types of conventional apparatus. For instance, the finely divided theophylline may merely be spread on trays or any other suitable containers within a closed compartment which contains a separate supply of the amine and preferably of water vapor. The volatility of the amine is such that it will evaporate and continue to do so until it and the theophylline have completely reacted. The product may then be removed and replaced by a fresh supply of theophylline. When necessary, the ethylenediamine and water vapor may be replenished. The product, ready for packaging, consists of pure aminophylline monohydrate in the form of a fine, soft powder readily soluble in water to form a clear, colorless solution. As previously mentioned, this process can be operated at room temperature, but it is advisable to utilize an elevated temperature in order to hasten the evaporation of the amine and its reaction with the theophylline. Instead of such a batchwise procedure, a continuously moving stream of theophylline may be passed through an atmosphere of ethylenediamine and water vapors. The theophylline may be agitated during contact with such vapors, so that fresh surface is exposed for reaction, and the reaction vessel may be jacketed or equipped with coils in order to maintain a suitable temperature. Ethylenediamine may be vaporized in a second vessel and piped into the reaction zone. Precautions must be taken so that the amine is not allowed to condense and mingle as a liquid with the theophylline, in which event the disadvantages of a usual liquid phase operation might result.

It is particularly effective to employ a conventional continuously rotating, inclined drum-type dryer as the reactor. In this case theophylline is charged at the higher end of the drum and vaporized ethylenediamine-water mixture is introduced at the lower end. The inner walls of the drum may be equipped with baffles to agitate the solid reactant during its passage along the inclined drum. As is common practice with such equipment, the rate of travel of the solid through this reactor can be controlled by the angle of inclination and the rate of revolution. Whatever type of reaction chamber is used, precautions should be taken so that air is not admitted thereto and ethylenediamine vapor is not allowed to escape.

The following examples illustrate the present process, but are not to be considered the only manner in which it may be conducted. Various alternative procedures will occur to those skilled in the art, and the invention is limited only by the scope of the appended claims.

Example I

An ethylenediamine-water mixture containing 7.95 grams of anhydrous amine and 3.55 grams of water was put in a small petri dish which in turn was placed in the center of a larger flat glass dish. Around the petri dish in the larger dish were spread 40.0 grams of powdered anhydrous theophylline. The system was then covered tightly and placed in an oven overnight at a temperature which ranged from about 50° to about 68° C. In the morning a powdered material was recovered therefrom and heated at 66° C. for one hour, in order to free it from any slight excess of water vapor or ethylenediamine. The product weighed 48.1 grams and was shown by standard tests to be hydrated aminophylline (2 molecules theophylline: 1 molecule ethylenediamine: 1 molecule water) of such quality as to pass the specifications of the U. S. Pharmacopoeia. It possessed excellent solubility in water and analyzed 13.52% by weight of ethylenediamine and 81.8% of theophylline.

In this experiment 19% excess of ethylenediamine over that theoretically required was used. This excess may naturally be decreased without affecting completion of the reaction. A larger excess of water vapor was present. This was in no way harmful and was readily removed without changing the quality of the product.

Example II

A standard stainless steel, drum-type, suitably vented ribbon blender was loaded with 100 pounds of crystalline anhydrous theophylline. The charge was agitated by tumbling at a moderate rate. A total of 12.58 liters of ethylenediamine aqueous solution (703.2 grams of amine per liter of solution) was separately distilled and the vapors fed into the blender over a period of about 14 hours. The rate of vaporization was adjusted so that the temperature within the blender was maintained at approximately 50 to 52° C. without cooling the walls. The aminophylline product obtained from the reaction resembled very closely in appearance the theophylline used as starting material. It weighed 122 pounds and analysis showed it to contain 14.24% by weight ethylenediamine. It was dried in trays at 52° C. for 18 hours under atmospheric pressure. The dried final product weighed 120 pounds (98 per cent of the theoretical weight) and analyzed 13.8% ethylenediamine and 81.1% anhydrous theophylline. It displayed excellent solubility when tested by the method described in the U. S. Pharmacopoeia and was perfectly white in color. Particle size was determined by screening and there was found to be a slight reduction in average particle size over that of the initial reactant. The material was free flowing, of excellent quality and highly valuable for use in therapy.

Example III

A reactor was constructed from a 1200 milliliter stainless steel beaker equipped with a stainless steel gate-type stirrer. The stirrer was driven by a 1/60 horse power motor, and the beaker was equipped with a tight fitting asbestos cover. The reactor was immersed in a larger beaker containing water and the larger beaker was placed on an electric hot plate to control the temperature. At one side of the reactor was mounted a 250 milliliter distilling flask to which was attached a 0.5 cm. asbestos covered glass tube. The glass tube led into the reactor through its asbestos cover. In the reactor was placed 250 grams of theophylline and heat was applied to the apparatus until the temperature of the theophylline reached 60° C. In the distilling flask was placed 53 grams of 79% ethylenediamine and 1 milliliter of water. The distilling flask was heated and the rate of distillation of the amine was controlled so that it was completely distilled in a period of one hour. Throughout the distillation the theophylline was stirred at a moderate rate and the stirring was continued for one more hour. The product was a white fluffy mass of powder with the following composition:

| | Per cent |
|---|---|
| Theophylline | 82.0 |
| Ethylenediamine | 13.7 |
| Water | 4.3 |

A number of reactions were carried out in the manner described above varying the temperature of reaction, the time of distillation and the time of stirring after distillation. By these experiments it was found advisable to use an elevated temperature not higher than 80° C. The time of distillation of the ethylenediamine could be reduced to as low as 45 minutes, and it usually required at least 45 minutes further stirring to assure conversion to the desired product.

What is claimed is:

1. A process for the preparation of aminophylline which comprises contacting solid theophylline with ethylenediamine vapor.

2. A process for the preparation of aminophylline which comprises contacting solid theophylline with ethylenediamine vapor and water vapor.

3. A process for the preparation of aminophylline which comprises contacting two moles of finely divided, crystalline theophylline with at least one mole each of ethylenediamine vapor and water vapor.

4. A process according to claim 2 in which the reaction is conducted at a temperature of from about room temperature to about 80° C.

5. A process according to claim 1 wherein the product is heated at between about 50° and about 80° C. to remove unreacted volatile material.

AXEL T. NIELSEN.
ANIELLO A. ROMANO.

No references cited.